United States Patent Office 3,649,400
Patented Mar. 14, 1972

3,649,400
METHOD OF MANUFACTURING NONWOVEN
FABRIC WITH PATTERN FORMED THEREON
Teiji Sawaki, Niwa-gun, Aiti Prefecture, and Sigenobu
Otsuka, Hasima-gun, Gifu Prefecture, Japan, assignors
to Toa Wool Spinning & Weaving Co. Ltd., Osaka,
Teiji Sawaki, Aiti Prefecture, and Sigenobu Otsuka,
Gifu Prefecture, Japan, fractional part interest to each
Filed Mar. 14, 1969, Ser. No. 807,286
Claims priority, application Japan, Mar. 16, 1968,
43/17,445; Aug. 13, 1968, 43/66,914; Dec. 30,
1968, 44/971
Int. Cl. D01h 1/48
U.S. Cl. 156—148       8 Claims

ABSTRACT OF THE DISCLOSURE

A nonwoven fabric having a colored pattern of designs thereon made of colored fibers, such as yarn, secured thereto by needling. The process of manufacture of the patterned nonwoven fabric comprises disposing the colored fibers on the base fabric in position where they are to be fixed and subjecting the base fabric and the colored fibers thereon to needling by closely spaced needles that pierce the base fabric and entangle the colored fibers on the base fabric and render the areas of the base fabric and pattern colored fibers thereon substantially homogenous. The colored fibers are disposed on the base fabric by mounting or otherwise securing the fibers in a pattern arrangement on a carrier such as a thin film by bonding, flocking and the like and then letting the carrier overlie the base fabric and subjecting the fibers, carrier and base fabric to needling. The base fabric can be embossed in areas corresponding to the desired pattern and the colored fibers are received in the embossed areas. The carrier film is removed after the design fibers are fixed on the base fabric.

This invention relates to nonwoven fabrics and more particularly to a nonwoven fabric with a pattern formed thereon without dyeing and the method of manufacture thereof.

In woven fabrics patterns may easily be woven into the fabric. In the case of nonwoven fabric patterns, for example colored designs comprising figures and shapes and the like, are formed thereon by press-dyeing. Press dyeing consists in dyeing the fibers so that the pattern is only superfically on the base fabric. The coloring in such patterns will generally fade easily and since only certain areas must be dyed the production of such nonwoven fabrics with patterns thereon is quite expensive. In view of the limited way of producing a pattern on a nonwoven base fabric generally nonwoven materials are sold without such patterns and are not as beautiful as they might be and are somewhat common place and even monotonous.

It is a principal object of the present invention to provide a nonwoven fabric with a pattern consisting of designs such as figures, shapes and the like richly colored and of any desired configuration.

Another object of the invention is to provide a method for manufacturing nonwoven fabrics with beauttiful colored patterns thereon made of colored fibers secured to the fabric and made integral therewith so that the pattern is stable and less apt to fade.

Another object is to provide a mehod of manufacture of patterned nonwoven fabrics permitting free selection of colors and pattern to be employed without need of changing the process due to the difference in colors or patterns being employed from one type nonwoven fabric to another.

Another object of the present invention is to provide a method in which the pattern is stabilized and of homogenous quality and permanently fixed so that it is not removed by use of the base fabric.

According to the invention a nonwoven base fabric is produced with the pattern thereon formed by colored fibers, for example yarn fibers, entangled and permanently secured in a pattern arrangement on the base fabric in areas in which the base fabric has been pierced by needles entangling the fibers and permanently securing them on the base fabric in the piercing of the needles.

According to the method of the invention a nonwoven base fabric is provided. Colored fibers are disposed on the base fabric overlying it in a pattern arrangement. The fibers may be flocked onto the areas in which they have to be secured on the base fabric or otherwise mounted on a carrier, for example a thin film or plastic, and while in an overlying position are subjected to a needling operation in which a plurality of closely spaced needles pierce the base fabric and entangle the fibers in the base fabric to fix them in the pierced areas rendering the pattern permanently fixed to the base fabric and of a homogeneous quality.

The pattern formed may have any kind of configuration and may consist of various colored designs comprising shapes of animals, plants, humans, landscapes figures and the like. The process employed for making the different patterns may be the same in all instances.

Other features and advantages of the nonwoven pattern and the method of manufacture thereof in accordance with the present invention will be better understood as described in the following specification and appended claims in conjunction with the following drawings in which:

FIG. 2b is a fragmentary perspective view of a process similar to that of FIG. 2a;

FIG. 3b is a fragmentary perspective view of the method of manufacture of FIG. 3a;

FIG. 5b illustrates flocking of colored fibers on the embossed fabric of FIG. 5a;

According to the invention a nonwoven fabric 1 is provided. This nonwoven fabric is free of any pattern and is manufactured in any known manner and material. Figures or designs cut or otherwise punched from colored lap material, for example a red leaf design 2 and a yellow leaf design 3 are disposed on the nonwoven fabric on a major face thereof overlying the fabric. The design material is made of fibers which are entangled in the base fabric for securing the designs thereon permanently. In order to effect the entanglement and permanent securing of the fibers the pattern elements 2, 3 and base fabric are subjected to a needling process, later described herein in which a plurality of needles pierce the base fabric and entangle the fibers in the base fabric permanently securing them thereto.

The base fabric is thus patterned quite easily without using a dobby or jacquard loom and accordingly the patterned nonwoven fabric is produced much less inexpensively than patterned woven fabric. For example, if the method of the invention is applied to an unpatterned blanket the blanket will be figured and can be fluffed. Moreover, the materials may be made of unfigured wool and is fluffed up and patterned so that an inexpensive overcoat material can be produced according to the invention.

Figure 1A:
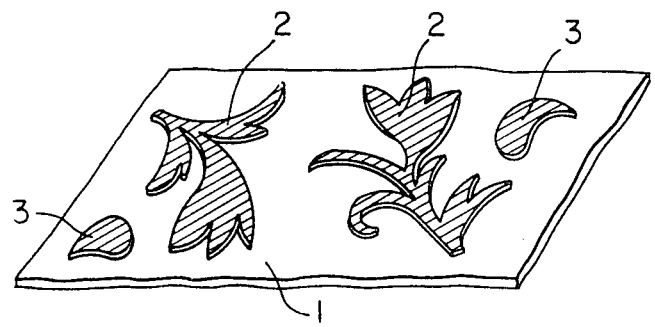
FIG. 1a is a fragmentary perspective view of a nonwoven fabric with pattern designs thereon before being fixed thereto.
Figure 1B:
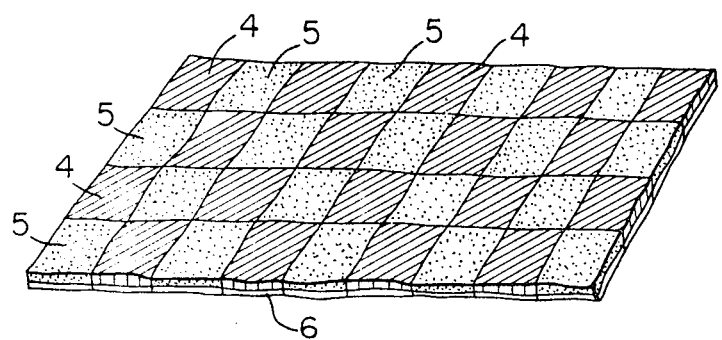
FIG. 1b is a fragmentary perspective view partly in section illustrating a mosaic patterned fabric according to the invention.

In FIG. 1b a base fabric thinner than that illustrated in FIG. 1a is illustrated and colored fiber lap made in rectangular shapes, for example green rectangles 4 and blue rectangles 5 bonded to a thin film, for example a thin polyethylene film, is disposed overlying the thin base fabric 6. The colored fibers, film and base fabric are then subjected to a needling process in which the base fabric is pierced and the fibers entangled in the piercings permanently fixing the pattern on the base fabric. The thin base fabric with the pattern formed thereon can then be used for making a dress material.

Figure 2A:
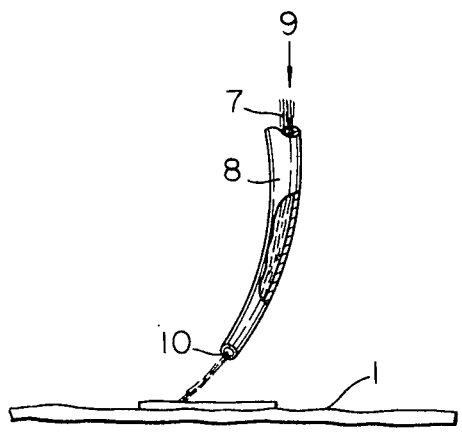
FIG. 2a is a fragmentary elevation view illustrating a method of flocking fibers for forming a pattern on a nonwoven fabric according to the invention.
Figure 2B:
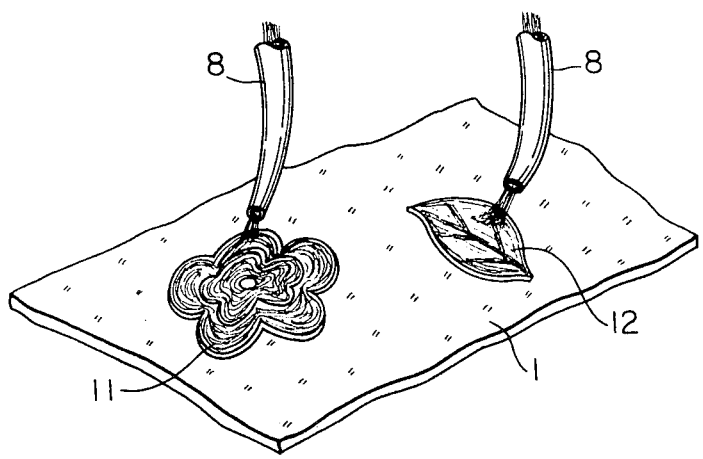

The various designs or shapes are formed on the lap material from which they are cut or on a carrier film by flocking for example as illustrated in FIGS. 2a and 2b. Red slivers 7 are blown through a conduit or pipe 8 by a stream of air blowing in the direction illustrated by an arrow 9 and are blown out an outlet 10. The slivers 7 are distributed over a lap material in various shapes by moving the conduit 8 in a selected configuration. The lap material may have an adhesive thereon for bonding the fibers thereto and the fibers are subjected to needling as hereinafter described.

FIG. 2b illustrates delivery of slivers or fibers by devices 8 in a manner similar to that of FIG. 2a for forming designs or shapes 11, 12 on a base fabric 1.

It will be understood that subsequent to the needling process hereinafter described the fibers defining the pattern may be stabilized by applying a suitable adhesive and treating the fabric and fibers to a heat treatment so that the fibers are permanently secured. The various adhesives or bonding agents and the temperatures employed are well-known in the art.

Figure 3A:
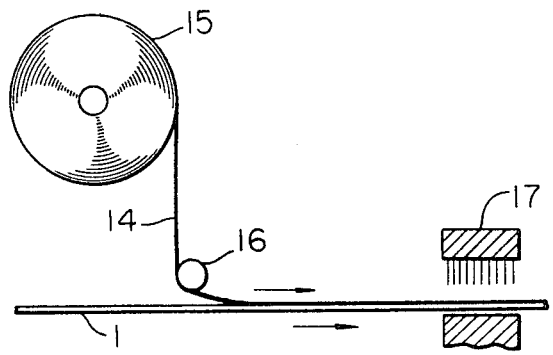
FIG. 3a is an elevation view, partly in section, illustrating diagrammatically a needling process according to the invention.
Figure 3B:
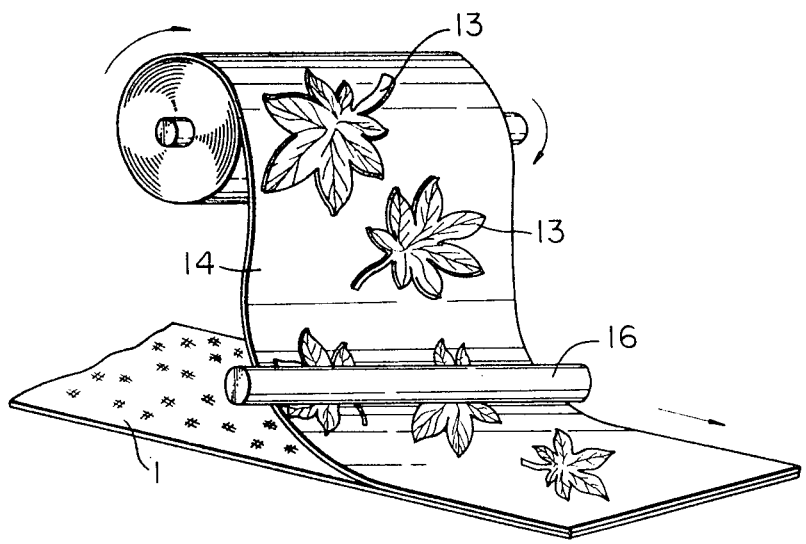

The pattern figures may be cut from, lap as illustrated in FIG. 1 to form designs, for example designs 13 shown in FIG. 3b or the same shapes may be formed on a film by flocking as before described in which case the film has an adhesive thereon for bonding or fixing the patterns to the film. As illustrated in FIGS. 3a and 3b a thin flexible synthetic film 14, for example a water soluble resin such as PVA, is wound as a roll 15 in which the designs 13 formed in either of the methods heretofore are disposed overlying a base fabric as illustrated in the drawing by a guide roller 16. The fabric and the film are illustrated as travelling in the same direction in parallel paths. With the film 15 overlying the fabric 1 a needling process is applied by a needle punching machine 17. The needles in the apparatus illustrated are closely spaced and are received in openings in a lower plate into which they extend so that the film 14 and the base fabric 1 are pierced across their full width if necessary. The needles are actuated upwardly and downwardly in timed relationship with the travelling film and fabric, by means not shown, so that the fibers forming the pattern are entangled in the piercings in the basic fabric. The needling operation is carried out such that the fibers are substantially homogeneously made integral in the pattern areas of the fabric. It being understood that the needling operation is effected to permanently fix the pattern on the nonwoven fabric 1.

Furthermore, the designs 13 may be disposed between two sheets of polyethylene film forming a sheet 14 which is then processed in the manner illustrated in FIGS. 3a and 3b. The base fabric and the sheet material subjected to the needling process may then be subjected to a heat treatment and pressing which produces a patterned nonwoven fabric which is not easily depilated.

Figure 4:
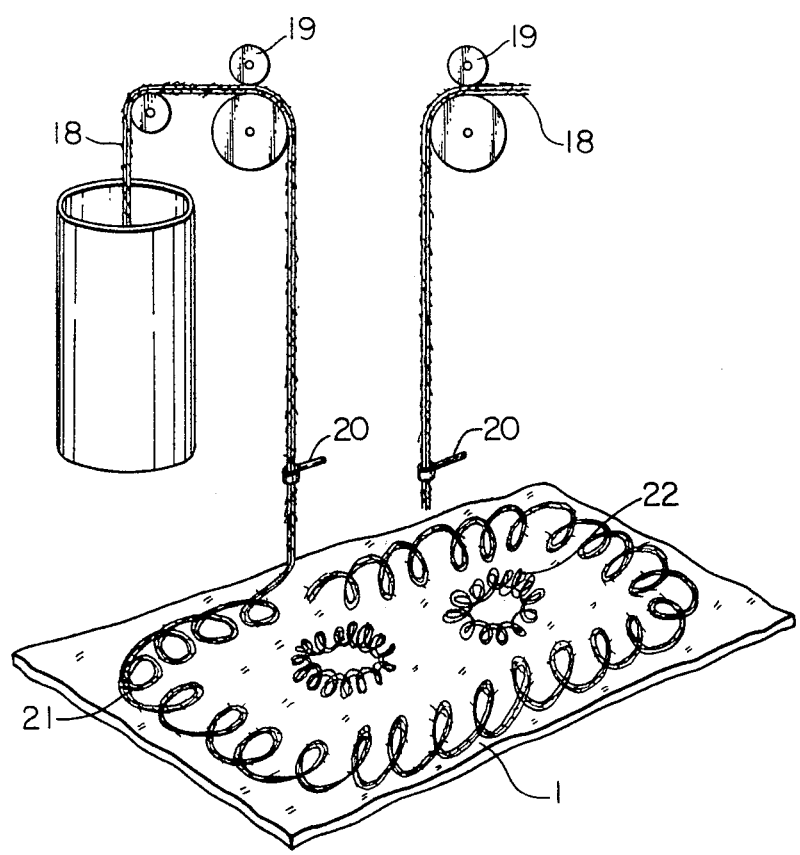
FIG. 4 is an elevation view of apparatus and method of forming a pattern on a nonwoven fabric according to the invention.

Another method of carrying out the invention is illustrated in FIG. 4 in which yarn silver or roving 18 which is colored is delivered by guide and feed rolls 19 cooperating with guides 20, which are actuated manually or by mechanism not shown, for distirbuting the roving or yarn 18 in patterns on a base fabric 1. The fibers forming the yarn are then subjected to a needling process in the manner heretofore described with respect to FIGS. 3a and 3b. The guides 20 may be automatically controlled in which case they are linked by links to guide patterns, not shown, for example control templates.

Figure 5A:
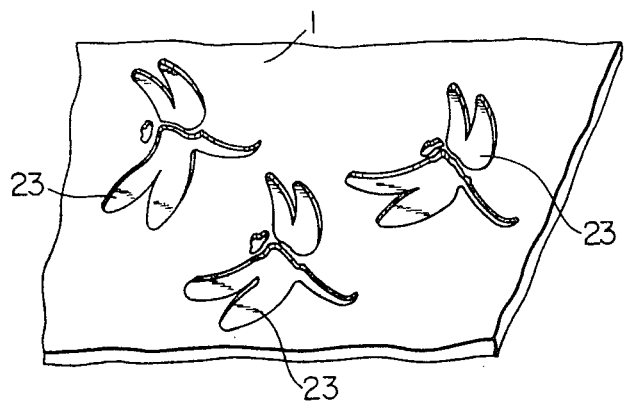
FIG. 5a is a perspective fragmentary view of a base fabric having embossed areas in a selected pattern configuration and arrangement.
Figure 5B:
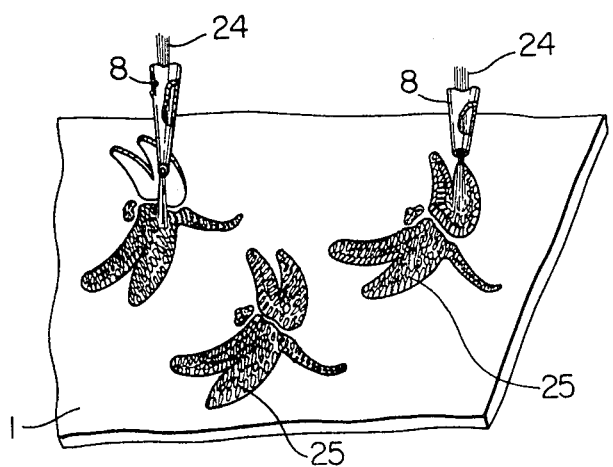

The nonwoven base fabric 1 may be embossed, for example, by a high frequency electro-thermal press process which is well-known. FIG. 5a illustrates a base fabric 1 having embossed areas 23 defining designs as illustrated. Fibers 24 are flocked by devices 8 applying the colored fibers 24 with air pressure and elements 8 as before described. The flocking devices 8 are controlled to deliver the fibers over the embossed areas so that the designs or figures 25 are formed and the designs and base fabric are then subjected to the needling process heretofore described so that the fibers are integrally entangled and made uniform or homogeneous with the base fabric.

Figure 6:
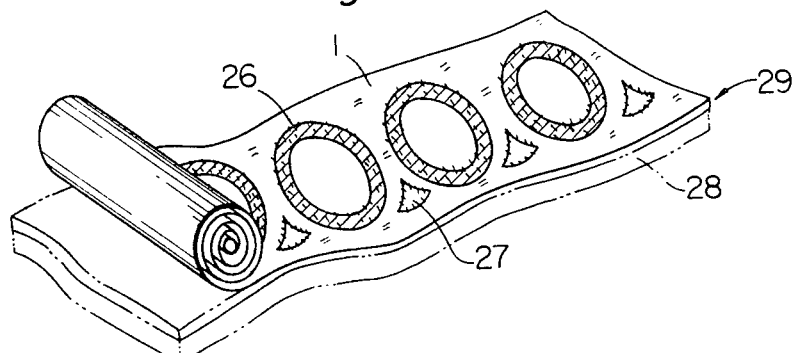
FIG. 6 is a fragmentary perspective view of a nonwoven fabric with a thin film carrier, having designs disposed in a pattern, on the base fabric for eventual securing of the designs thereon.
Figure 7:
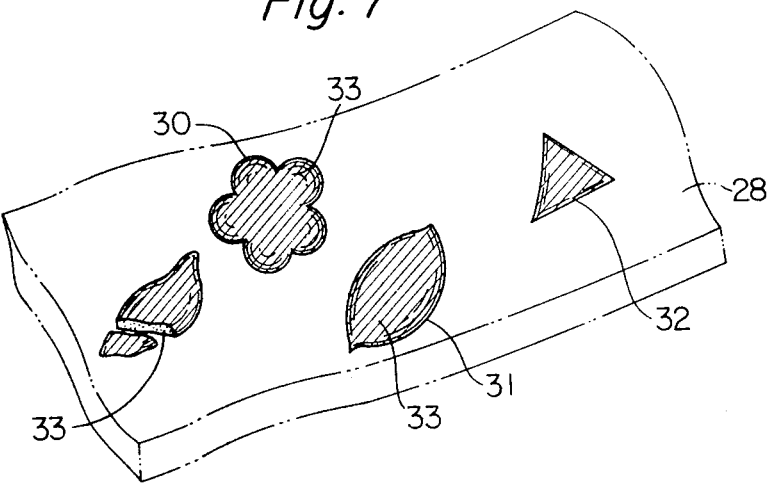
FIG. 7 is a fragmentary perspective view of a nonwoven base fabric having fiber pads of different configurations and shapes arranged in a pattern for securing the fiber on the fabric by method according to the invention.

The process according to the invention can also be carried out by making desired designs 26, 27 on a transparent thin film 1' as illustrated in FIG. 6. This film may be a thin polyvinyl chloride or polyethylene film tape or PVA. The designs may be drawn for example on paper which has been punched out and arranged on the tape film and placed on it and adhesive coated areas formed. The areas with adhesive on the film have fibers flocked onto them by an electrostatic flocknig process. The film can then be superposed over a lap 28 and subjected to the needling continuously as before described so that the flocked potrion and the lap 28 are entangled with each other and the nonwoven fabric 29 is then assembled therewith and is patterned as desired; the fibers can be needled with the lap overlying the base fabric if desired.

In the above described method the longer the fibers the better. A recommended fiber length is the use of fibers about thirty millimeters long. The film once produced with the fibers thereon may be rolled and then unrolled and placed on the lap 28 overlying it and then subjected to the needling in conjunction with the lap and base fabric 29 as heretofore described. The film 1' is peeled off after the needling process. If a polyvinyl alcohol film is used it may be washed away and only the entangled fibers remain.

The patterns may likewise be formed by placing the fibers in film bags made, for example of PVA, in the shape or configuration of the designs of the pattern. For example, a floral design 31 made of different colored fibers 33. That is to say multiplicity of different colored fibers 33 in film bags 30 are made up in configurations such as leaves 32. The bags are disposed on a lamp 28 which is subjected to preliminary needling with the lap. The bags may also be subjected to preliminary needling in its filled state and then is placed directly on the lap 28 and subjected to the needling process as before described. The fibers contained in the bag and those in the lap are interlaced and entangled so that the nonwoven fabric with floral designs is obtained.

Figure 8:
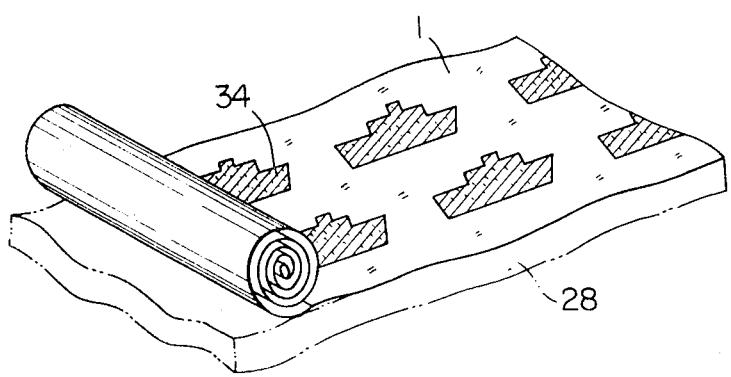
FIG. 8 is a fragmentary view of the base fabric with colored fibers on a film arranged in a pattern and secured thereon for eventual securing to a base fabric according to the invention.

The method may likewise be carried out as shown in FIG. 8, by placing designs which have been punched out from a film and secured on a carrier film 1''. Monocolored or multicolored fibers are first flocked onto a film that has adhesive thereon and the designs are then punched out according to the desired shape and then the film designs are bonded with the fiber designs 34 thereon, onto a carrier film 1''. This film 1'' is then placed on a lap 28 and is removed for example by washing, after the needling process so that only the designs 34 remain fixed to the nonwoven fabric which then has patterns corresponding to designs 34.

Figure 9:
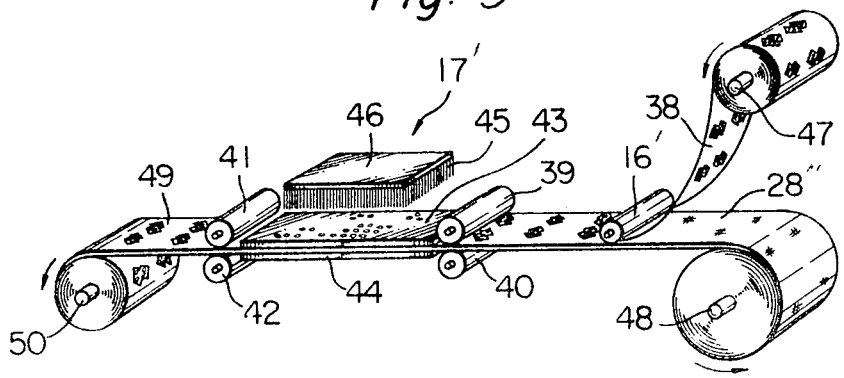
FIG. 9 is a perspective view of mechanism for manufacturing a nonwoven pattern fabric by a method according to the invention.
Figure 10:
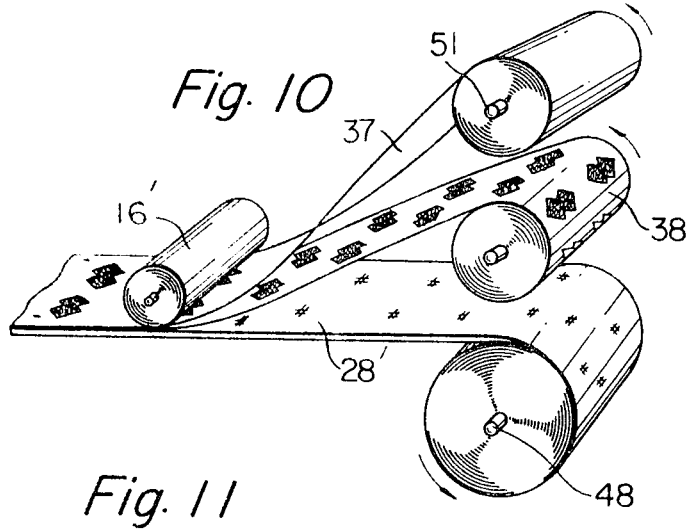
FIG. 10 is a perspective view of a part of the type mechanism illustrated in FIG. 9.
Figure 11:
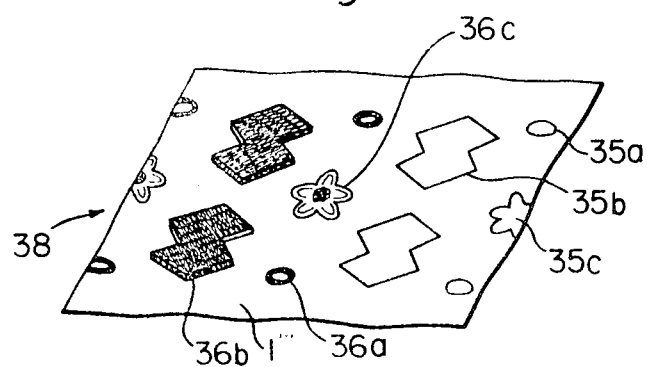
FIG. 11 is a fragmentary view of the construction of a pattern carrier, comprising a thin film, illustrating the pattern configurations and the formation of a pattern with fibers bonded on the pattern areas.

A method and apparatus by which a pattern may be developed on a carrier film with a multiplicity of colored fibers are illustrated in FIGS. 9–11 inclusive. Designs 35 to 35c inclusive may be marked off or printed on a film 1''' and designs 36a 36b, 36c of collective fibers which have been punched into the shapes corresponding to the printed shapes or designs 35 from various colored lap material are placed on the corresponding designs 35 and bonded to the film with a suitable adhesive which has been spread on the film entirely over the surface or partially over the surfaces thereof. Thus a lap of nonwoven film 38 is formed and this patterned lap 38 and a covering film 37 wound on a roll 51 are applied to a nonwoven fabric 28 wound in a roll 48 by an applying roll 16' as before described. The entire three-layer material is then subjected to a needling process for securing the designs in the manner heretofore described.

In FIG. 9 a needling apparatus 17' is illustrated as having intermittently driven feed rolls 39, 40 delivering a base fabric 28'' and a film 38 in conjunction with guide rolls 41, 42 delivering the material 38 which could be formed for example from two films 37, 38, to a take-up roll 50. As the rolled materials are delivered or advanced longitudinally a needle plate 46, having a plurality of downwardly extending needles 45 fixed thereon closely spaced, is reciprocated upwardly and downwardly and the needles are received in a stripper plate 43 and a bed plate 44 having corresponding apertures receiving the needles so that the sheet material is pierced throughout so that a homogeneous nonwoven fabric 49 is developed in which the pattern design fibers are interlaced and entangled forming a patterned finished fabric as before described. The material advances between the stripper plate and bed plate in timed sequence with the reciprocal movements of the needles 45.

Thus the invention provides a finished patterned nonwoven fabric in which the fibers are colored and a pattern is permanently fixed thereon. The method according to the invention is much easier to perform and more economical to carry out than dyeing. Thus when the finished fabric is fluffed and finished the designs and color thereof are permanent and will not fade and an elegant figured fabric is obtained.

As above pointed out the synthetic carrier film may be subjected to heat treatment which results in better securing of the pattern fibers and fabrics onto the base fabric. Furthermore, PVA is a good adhesive and if it is used this water soluble resin will further assist in fixing the design fibers on the base fabric when it is washed to remove the carrier film. Moreover, the patterns may be of a single color or multicolored and the film on which they are placed may be of the same width as the fabric or lesser width as desired.

While preferred embodiments of the invention have been shown and described it will be understood that many modifications and changes can be made within the true spirit and scope of the invention.

What we claim and desire to be secured by Letters Patent is:

1. A method of manufacturing a patterned nonwoven fabric with a pattern thereon comprising, providing a nonwoven base fabric, providing a film having at least one design comprising colored fibers adhered to said film, disposing on said base fabric overlying said base fabric said film with said at least one design comprising colored fibers, piercing the base fabric and said film with needles at least in the area in which said design fibers are disposed entangling the fibers in said base fabric to secured said fibers on said base fabric while maintaining the design in which said fibers are arranged, and removng said film from said base fabric while maintaining said entrangled fibers secured on said base fabric.

2. A method of manufacturing a patterned nonwoven fabric according to claim 1, including securing said fibers on said film to make said design and prior to disposing said film with said design thereon overlying said base fabric.

3. A method of manufacturing a patterned nonwoven fabric according to claim 1, in which said film comprises a water soluble resin.

4. A method of manufacturing a patterned nonwoven fabric according to claim 3, in which said resin comprises polyvinyl alcohol.

5. A method of manufacturing a patterned nonwoven fabric according to claim 2, in which said film comprises a thermal plastic material meltable for removal thereof adhering said fibers to said basic fabric.

6. A method of manufacturing a patterned nonwoven fabric according to claim 2, including after removing of said film applying a bonding agent to said fibers adhering the fibers on said base fabric.

7. A method of manufacturing a patterned nonwoven fabric according to claim 1, including flocking said design fibers on said film arranged in said design for disposing the design overlying said base fabric.

8. A method of manufacturing a nonwoven fabric according to claim 1, including embossing the base fabric in areas corresponding to said design before disposing said film thereon, and said colored fibers on said film being disposed in registry with said embossed areas of said base fabric before said needling.

References Cited
UNITED STATES PATENTS

| | | | |
|---|---|---|---|
| 2,684,319 | 7/1954 | Arnold | 156—148 |
| 3,197,355 | 7/1965 | Copeland | 156—148 X |
| 3,201,300 | 8/1965 | Hoffman | 156—148 X |
| 3,354,020 | 11/1967 | Copeland | 156—148 X |
| 3,366,529 | 1/1968 | Olson | 156—148 X |
| 3,476,636 | 11/1969 | Crosby | 156—148 X |
| 3,523,861 | 8/1970 | Newman et al. | 156—148 X |

CARL D. QUARFORTH, Primary Examiner

G. G. SOLYST, Assistant Examiner

U.S. Cl. X.R.

156—622, 63, 209, 253